(No Model.)
H. E. LONG.
TOE WEIGHT FOR HORSES.
No. 450,826. Patented Apr. 21, 1891.
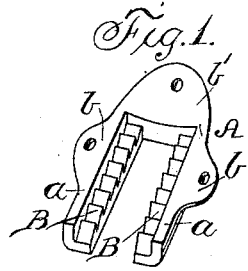
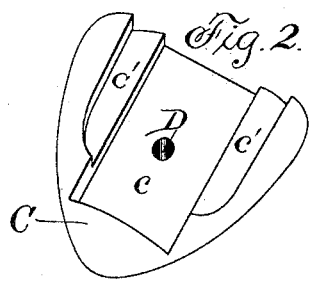
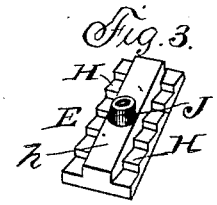
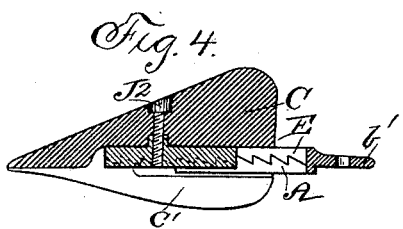
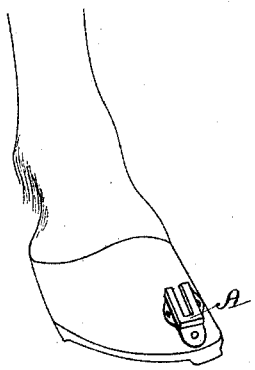
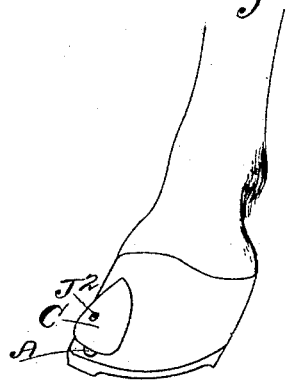
Witnesses
O. W. Files
W. A. Springer
Henry E. Long,
by
Thomas G. Orwig,
his Atty.

UNITED STATES PATENT OFFICE.

HENRY E. LONG, OF DES MOINES, IOWA.

TOE-WEIGHT FOR HORSES.

SPECIFICATION forming part of Letters Patent No. 450,826, dated April 21, 1891.

Application filed August 30, 1890. Serial No. 363,535. (No model.)

*To all whom it may concern:*

Be it known that I, HENRY E. LONG, a citizen of the United States of America, residing at Des Moines, in the county of Polk and State of Iowa, have invented a new and useful Toe-Weight for Horses, of which the following is a specification.

My invention relates to that class of devices which are attached to the toe of a horse's hoof to weight the same, and has for its object the provision of means by which the weight may be readily attached and securely held to the toe of the hoof of the horse and also readily detached therefrom, and also in the construction of the parts and their arrangement, so that that portion permitted to remain constantly on the hoof shall be light and the use of necessary means to attach the weight proper directly to the hoof be avoided.

My object consists, further, in the provision of means by which the said weight may be readily adjusted relatively to the height of the hoof of the horse and in so securing the weighted portion upon the hoof as that there is practically no strain upon the top of the weight, greatly reducing the strain upon the fastening-screws.

My invention consists in a clip which is slightly cupped to conform to the shape of the hoof, which clip has ratchet-teeth on embracing-arms, which teeth are adapted to be engaged by the teeth formed on a spur, which latter is detachably secured to the weight portion and is embraced when the weight is adjusted on the hoof by the arms of the clip.

My invention consists, further, in certain details of construction hereinafter more particularly set forth, reference being had to the accompanying drawings, in which—

Figure 1 is a perspective view of the clip, shown detached from the hoof. Fig. 2 is a perspective view of the rear of the weighted portion, the spur being detached. Fig. 3 is a perspective view of the spur. Fig. 4 is a longitudinal section, the parts being joined together. Fig. 5 is a perspective view of the hoof of a horse, showing the clip attached permanently. Fig. 6 is a perspective view of the hoof of a horse, showing the parts joined together on the hoof as in practical use.

A, Fig. 1, indicates a clip which is formed with embracing-arms $a$ $a$, being slightly cupped to conform to the shape of the hoof, and having one of its sides cut out or recessed and within said recessed portion having formed two series of vertical ratchet-teeth B, which are arranged, respectively, on each of the embracing-arms $a$ $a$. Formed with the clip A are the ears $b$ $b$ on each side thereof and the ear $b'$ at its upper portion, each of said ears being perforated to admit a fastening-screw.

In Fig. 2 is shown the rear portion of the weight C, which has its central portion cut out or recessed at $c$, and also having channels $c'$ $c'$ formed, which are opened into the recess $c$ of the central portion. The weight B is slightly cupped to conform to the shape of the hoof.

D is a perforation extending through the weight C.

Referring to Fig. 3, E indicates the spur, which has the two series of ratchet-teeth H H, formed on each side of a central strip $h$. J is a boss, which is perforated, the said perforation extending through to the opposite side of the spur.

$J^2$, Fig. 4, is an attaching-screw adapted to engage screw-threads formed on the interior of the perforation in the spur E.

To adjust the parts the clip is attached to the hoof in the position shown in Fig. 4 by means of fastening-screws secured through the ears $b$ $b$ and $b'$. The boss J of spur E is then inserted within the perforation D of the weight and the adjusting-screw $J^2$ then inserted into said perforation D from the front of the weight C, and also screwed into the threads of the perforations in the spur, but as yet not so as to tightly bind the spur upon the rear of the weight, but simply to hold them to each other, leaving space for adjustment upon the clip. The spur and weight are then turned so that the base or wide portion of the weight is just above clip A. The weight and spur are then lowered down so that the embracing-arms $a$ $a$ of the clip penetrate between the weight and the spur, the ratchet-teeth B of the clip and the teeth H of spur engaging. The adjusting-screw may then be adjusted so as to bind the clip, spur, and weight together. The operator then determines the height which he desires the weight on the hoof and pushes the weight downward, the ratchet-teeth permitting downward but preventing any upward movement.

When the weight is adjusted at its lowest point on the hoof, the parts will assume the position shown in Fig. 4. Adjustment upwardly upon the hoof may be accomplished by merely loosening the screw $J^2$ and moving weight upwardly. It is now apparent that as the bulk of the weight is below the adjusting-screw there is practically no strain at the top of weight, lessening very materially the strain of the fastenings of the clip, and that the clip is light and when the spur is adjusted holds the weight firmly on the shoe.

Having thus described my invention, what I claim as new, and desire to secure by Letters Patent, is—

1. A toe-weight for horses, consisting of a clip adapted for permanent attachment to the hoof of the horse and having series of ratchet-teeth, a weight, and a spur adapted for attachment to the weight and having ratchet-teeth which mesh with those of the clip when the parts are adjusted, as and for the purposes stated.

2. A toe-weight for horses, consisting of a clip having embracing-arms on which are formed ratchet-teeth, which clip is adapted for permanent attachment to the hoof, a weight, and a spur removably secured to the weight, having ratchet-teeth which mesh with those of the clip when the parts are adjusted on the hoof, as and for the purposes described.

3. A toe-weight for horses, consisting of a clip having embracing-arms and ratchet-teeth formed on said arms and adapted for permanent attachment on the hoof, a weight, and a spur adjusted to and held upon the weight by an adjusting-screw, said spur having ratchet-teeth which mesh with those of the clip when the parts are adjusted on the hoof, as and for the purposes set forth.

HENRY E. LONG.

Witnesses:
 DORSY MACKINTOSH,
 C. C. BULKLEY.